United States Patent
Jillella et al.

(10) Patent No.: US 11,635,142 B2
(45) Date of Patent: Apr. 25, 2023

(54) DUAL BARRIER SEAL

(71) Applicant: Freudenberg Oil & Gas, LLC, Houston, TX (US)

(72) Inventors: Nagarjuna Jillella, Cypress, TX (US); Ian Smitham, South Wales (GB); Patrick Rawls, Swansea (GB); Keith Anderson, Houston, TX (US); James Smith, Houston, TX (US); Sebastian Ospina, Houston, TX (US)

(73) Assignee: Freudenberg Oil & Gas, LLC, Houston, TX (US)

( * ) Notice: Subject to any disclaimer, the term of this patent is extended or adjusted under 35 U.S.C. 154(b) by 56 days.

(21) Appl. No.: 16/683,805

(22) Filed: Nov. 14, 2019

(65) Prior Publication Data

US 2021/0148468 A1 May 20, 2021

(51) Int. Cl.
*F16J 15/06* (2006.01)
*F16L 23/20* (2006.01)
*F16L 17/08* (2006.01)
*F16J 15/34* (2006.01)
*F16J 15/00* (2006.01)

(52) U.S. Cl.
CPC ............. *F16J 15/061* (2013.01); *F16L 17/08* (2013.01); *F16L 23/20* (2013.01); *F16J 15/002* (2013.01); *F16J 15/062* (2013.01); *F16J 15/3484* (2013.01)

(58) Field of Classification Search
CPC .. F16L 23/18; F16L 23/20; F16L 17/08; F16J 15/002; F16J 15/062; F16J 15/08; F16J 15/0887; F16J 15/061; F16J 15/3484; E21B 2200/01
See application file for complete search history.

(56) References Cited

U.S. PATENT DOCUMENTS

| | | | |
|---|---|---|---|
| 2,898,000 A * | 8/1959 | Hanny | F16J 15/0887 277/649 |
| 3,141,685 A | 7/1964 | Watts | |
| 3,378,269 A | 4/1968 | Castor | |
| 5,103,915 A * | 4/1992 | Sweeney | F16L 23/20 166/379 |
| 5,431,417 A * | 7/1995 | Dahlgren | F16L 23/20 277/614 |

(Continued)

OTHER PUBLICATIONS

Extended European Search Report dated Mar. 5, 2021 (corresponding to EP 20200189.7).

(Continued)

*Primary Examiner* — Nicholas L Foster
(74) *Attorney, Agent, or Firm* — Daniel J. Sepanik, Esq.; Harness, Dickey & Pierce, P.L.C.

(57) ABSTRACT

An annular dual barrier seal includes a pair of axially extending inner seal lips and a pair of axially extending outer seal lips, the pair of inner seal lips are connected to the pair of outer seal lips by a radially outwardly extending web portion. The pair of inner seal lips extend axially by a first dimension and the pair of outer seal lips extend axially by a second dimension which is greater than the first dimension. The pair of inner seal lips have a sealing surface that is one of partially toroidal and partially elliptical and that engage the radially inwardly facing first sealing surface and the pair of outer seal lips have a sealing surface that is one of partially toroidal, partially elliptical and conical.

12 Claims, 2 Drawing Sheets

(56) References Cited

U.S. PATENT DOCUMENTS

| | | | |
|---|---|---|---|
| 5,466,018 | A | 11/1995 | Stobbart |
| 8,096,560 | B2 * | 1/2012 | Pallini, Jr. ............. E21B 33/043 |
| | | | 277/607 |
| 9,103,457 | B2 * | 8/2015 | Holliday ............... F16L 23/167 |
| 10,001,234 | B2 * | 6/2018 | Jansson ................... F16L 23/18 |
| 10,100,958 | B2 * | 10/2018 | Lee ......................... F16L 17/08 |
| 10,400,923 | B2 | 9/2019 | Shirani et al. |
| 2001/0045711 | A1 | 11/2001 | Johnson |
| 2009/0322030 | A1 * | 12/2009 | Pallini, Jr. ............... F16L 17/08 |
| | | | 277/336 |
| 2011/0266797 | A1 | 11/2011 | Stobbart |
| 2011/0316239 | A1 | 12/2011 | Holliday |
| 2015/0176744 | A1 | 6/2015 | Glassman et al. |
| 2017/0067583 | A1 * | 3/2017 | Illakowicz ........... F16J 15/0887 |
| 2018/0045347 | A1 | 2/2018 | Lee et al. |
| 2018/0231158 | A1 | 8/2018 | Shirani et al. |

OTHER PUBLICATIONS

Australian Office Action dated Aug. 12, 2021 (corresponding to AU 2020250258).

Canadian Office Action dated May 2, 2022 (corresponding to CA 3095388).

Weisstein, Eric W., "Toroid," MathWorld—A Wolfram Web Resource, https://mathworld.wolfram.com/Toroid.html, Dec. 17, 2019.

"Toroid," Dictionary.com, https://www.dictionary.com/browse/toroid, Dec. 31, 2018.

"Toroid," Merriam-Webster, https://www.merriam-webster.com/dictionary/toroid, Jun. 7, 2017.

* cited by examiner

DUAL BARRIER SEAL

FIELD

The present disclosure relates to a dual barrier seal and connection joint for conduits, pressure vessels or the like.

BACKGROUND

This section provides background information related to the present disclosure which is not necessarily prior art.

When connecting adjacent sections of fluid flow conduits or vessels, seal rings are typically interposed at the interface of adjacent connecting flanged conduits or vessel portions which are then bolted or clamped together. The seal ring is typically metallic, the seal being affected by deformation of a sealing lip of the seal ring against a sealing surface.

Most known seal rings and joints work, to a greater or lesser extent, when the pressure within the conduit, pressure vessel or the like is considerably greater than the ambient pressure outside of the conduit, pressure vessel or the like i.e. the seal or joint is pressure energized.

SUMMARY

This section provides a general summary of the disclosure, and is not a comprehensive disclosure of its full scope or all of its features.

An annular dual barrier seal includes a pair of axially extending inner seal lips and a pair of axially extending outer seal lips, the pair of inner seal lips are connected to the pair of outer seal lips by a radially outwardly extending web portion. The pair of inner seal lips extend axially by a first dimension and the pair of outer seal lips extend axially by a second dimension which is greater than the first dimension. The pair of inner seal lips have a sealing surface that is one of partially toroidal and partially elliptical and that engage the radially inwardly facing first sealing surface and the pair of outer seal lips have a sealing surface that is one of partially toroidal, partially elliptical and conical.

The seal ring and joint allows the contact pressure between respective sealing surfaces to be independently chosen.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
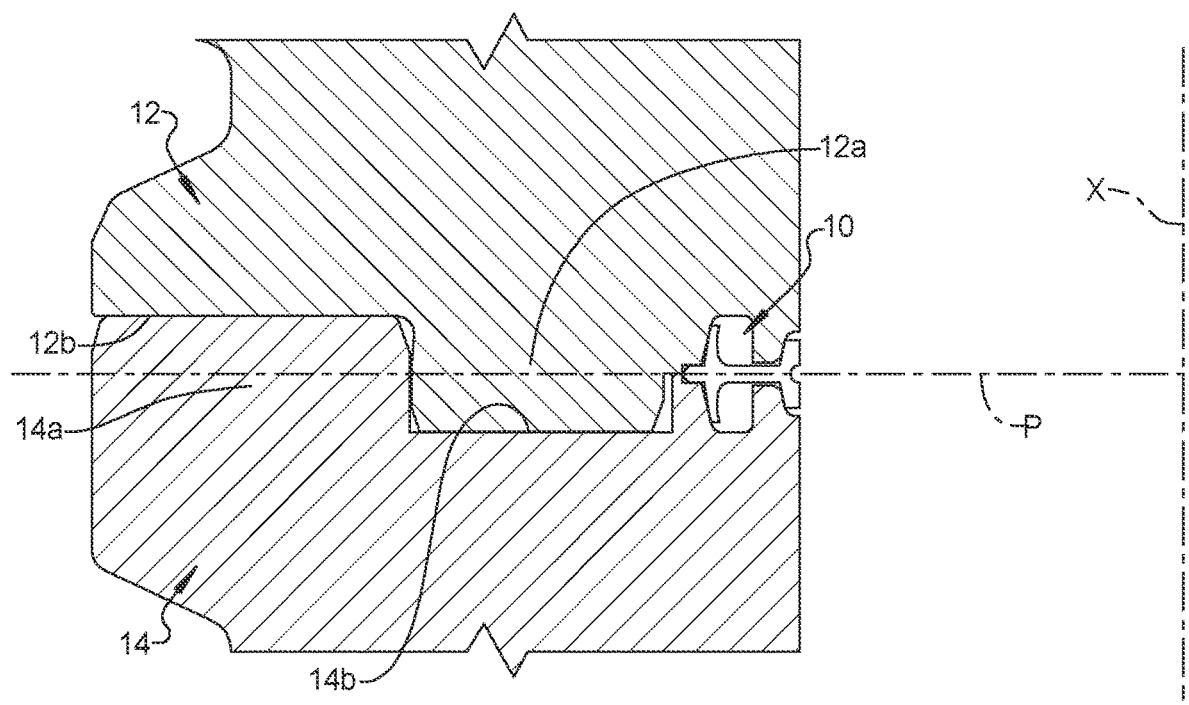
FIG. 1 is a partial cross-sectional view of a dual barrier seal disposed between two annular members.
Figure 2:
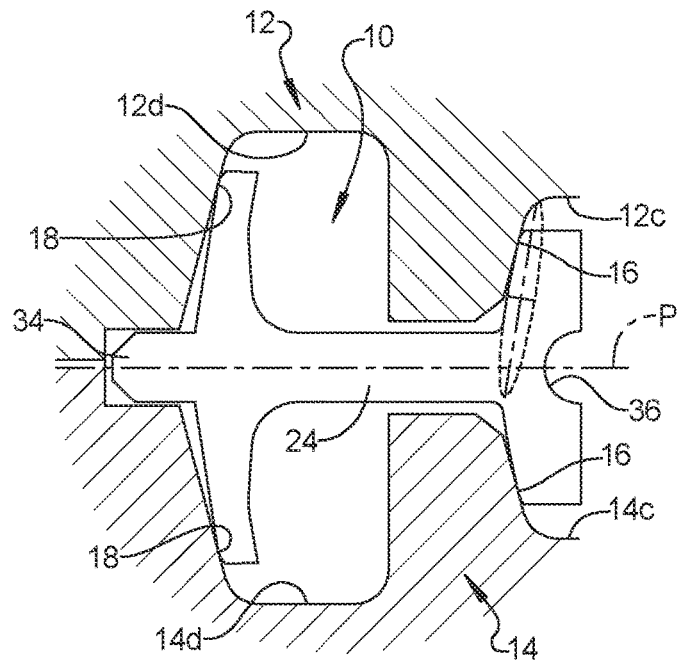
FIG. 2 is a detailed partial cross-sectional view of the dual barrier seal disposed between two annular members.
Figure 3:
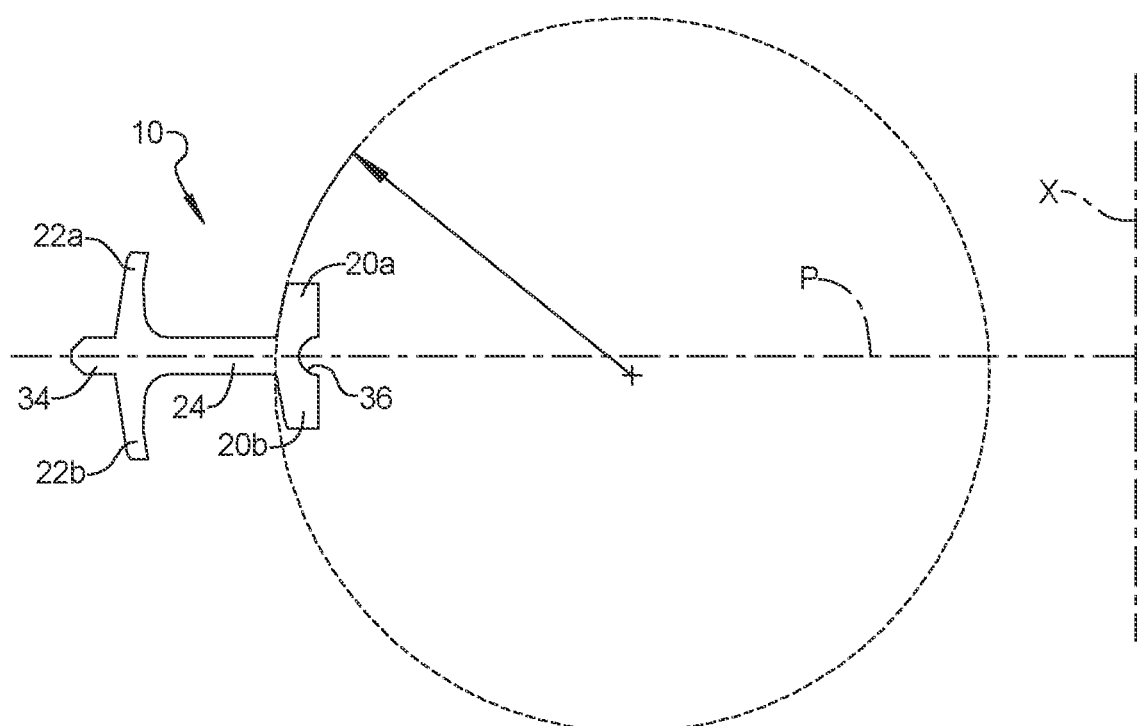
FIG. 3 is a partial cross-sectional view of the dual barrier seal.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 shows one such arrangement for a dual barrier seal 10 disposed between first and second annular conduit or vessel defining members 12, 14 (hereinafter "the first and second members 12, 14"). As shown in FIG. 1, the first and second members 12, 14 each include a respective interlocking annular protrusion 12a, 14a and a respective annular interlocking groove 12b, 14b each having a center axis X. As best shown in the detailed cross-sectional, the first and second members 12, 14 each include an inner seal receiving groove 12c, 14c and an outer seal receiving groove 12d, 14d. The inner seal receiving grooves 12c, 14c include inward facing sealing surfaces 16 and the outer seal receiving grooves 12d, 14d include inward facing sealing surfaces 18. The inward facing sealing surfaces 16, 18 of the inner seal receiving grooves 12c, 14c and the outer seal receiving grooves 12d, 14d can be conical or arcuate in cross-sectional shape.

Figure 4:
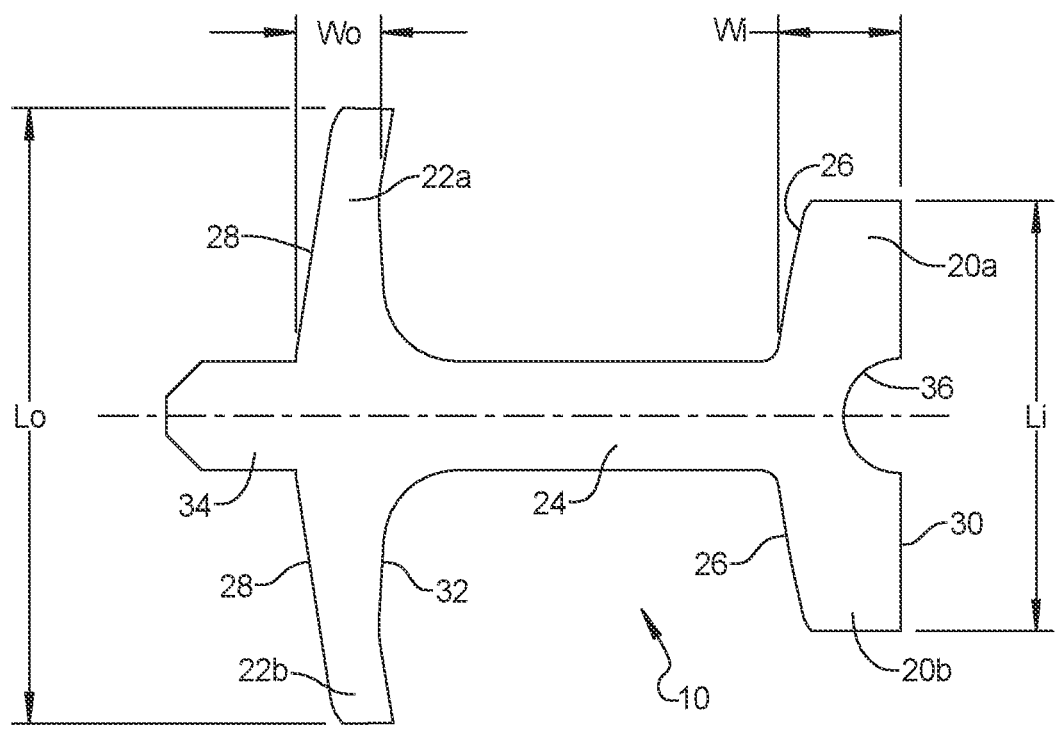
FIG. 4 is a detailed partial cross-sectional view of the dual barrier seal.

With reference to the detailed cross-sectional view of FIG. 4, the dual barrier seal 10 includes a pair of inner seal lips 20a, 20b and a pair of outer seal lips 22a, 22b. The pair of inner seal lips 20a, 20b are integrally formed with and connected to the pair of outer seal lips 22a, 22b by a radially extending web portion 24 that extends generally transverse to the pair of inner seal lips 20a, 20b and the pair of outer seal lips 22a, 22b. The dual barrier seal 10 has a center axis X that is coaxial with the first and second members 12, 14. The dual barrier seal 10 is symmetric with respect to a center plane P that intersects the dual barrier seal 10. The dual barrier seal 10 can be made from metal or a metal alloy and more particularly can be made from an austenitic nickel-chromium alloy. The pair of inner seal lips 20a, 20b and the pair of outer seal lips 22a, 22b are elastically deflectable.

The pair of inner seal lips 20a, 20b each include an outer sealing surface 26 that can be circular in cross section and partially toroidal in three dimensions. The pair of outer seal lips 22a, 22b each include an outer sealing surface 28 that can be circular in cross section and partially toroidal in three dimensions. In geometry, a toroid is a surface of revolution generated by revolving a circle in three-dimensional space with a hole in the middle, like a doughnut, forming a solid body. Alternatively, the outer sealing surfaces 26 of the inner seal lips 20a, 20b can be partially elliptical in cross section and the outer sealing surfaces 28 of the outer seal lips 22a, 22b can be conical or partially elliptical in cross section. The outer sealing surfaces 26 of the inner seal lips 20a, 20b and the outer sealing surfaces 28 of the outer seal lips 22a, 22b engage the inward facing sealing surfaces 16, 18 of the inner seal receiving grooves 12c, 14c and the outer seal receiving grooves 12d, 14d. Accordingly, the pair of inner seal lips 20a, 20b and the pair of outer seal lips 22a, 22b provides a dual barrier protection against pressure for normal design conditions.

The pair of inner seal lips 20a, 20b extend in an axial direction with a dimension $L_i$ and the outer seal lips 22a, 22b extend in an axial direction with a dimension $L_o$. The axial dimension $L_o$ of the outer seal lips 22a, 22b is greater than the axial dimension $L_i$ of the inner seal lips 20a, 20b. According to a preferred embodiment, the axial dimension $L_o$ is at least $1.1 <= x <= 3$ times greater than the axial dimension $L_i$ allowing a lower sealing point on the inner seal lips 20a, 20b compared to the pair of outer seal lips 22a, 22b.

A cross-section of each of the pairs of inner seal lips 20a, 20b and the pairs of outer seal lips 22a, 22b are non-symmetric about a line perpendicular to a radial direction at a midpoint of the web portion 24. The pair of inner seal lips 20a, 20b can include a generally cylindrical inner surface 30 and the pair of inner seal lips 20a, 20b have a radial width $W_i$ that is greater than a radial width $W_o$ of the pair of outer seal lips 22a, 22b. The pair of outer seal lips 22a, 22b have a contoured inner surface 32 that is concave in cross-section that includes a continually decreasing inner diameter from an axial mid-region of the outer seal lips 22a, 22b to the distal ends.

The dual barrier seal 10 further includes a retaining feature 34 shaped to retain the seal ring in a sealing position. The retaining feature 34 extends radially outward from the web portion 24 of the dual barrier seal 10. The dual barrier seal 10 further includes a removal feature 36 shaped to allow removal of the dual barrier seal 10 from contact with the sealing surfaces, wherein the removal feature 36 extends from or into the dual barrier seal 10 and the removal feature 36 is shaped to facilitate removing the dual barrier seal 10 from a sealing position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sealed joint system, comprising:
a first annular member and a second annular member each including opposing inner seal receiving grooves and outer seal receiving grooves, each of the inner seal receiving grooves including a radially inwardly facing first sealing surface and the outer seal receiving grooves including a radially inwardly facing second sealing surface;
an annular dual barrier seal including a pair of axially extending inner seal lips and a pair of axially extending outer seal lips, wherein the pair of inner seal lips are connected to the pair of outer seal lips by a radially outwardly extending web portion, the pair of inner seal lips being received in the inner seal receiving grooves and the pair of outer seal lips being received in the outer seal receiving grooves, wherein the pair of inner seal lips extend axially by a first dimension and wherein the pair of outer seal lips extend axially by a second dimension which is greater than the first dimension, wherein the pair of inner seal lips have a sealing surface that is one of a partially toroidal surface of revolution generated by revolving a portion of a circle in three-dimensional space with a hole in a middle or partially non-spherically elliptical and that the sealing surface of the pair of inner seal lips engages the radially inwardly facing first sealing surface and the pair of outer seal lips have a sealing surface that is one of partially toroidal, partially elliptical, or conical and that engages the radially inwardly facing second sealing surface.

2. The sealed joint system according to claim 1, wherein a radial width of the pair of inner lips is greater than a radial width of the pair of outer seal lips.

3. The sealed joint system according to claim 1, wherein the pair of outer seal lips have a contoured inwardly facing surface that is concave in cross-section and having a cross-sectional area near a sealing region having a substantially constant thickness.

4. The sealed joint system according to claim 1, further comprising a retaining feature shaped to retain the dual barrier seal in a sealing position, wherein the retaining feature extends from the web portion of the dual barrier seal.

5. The sealed joint system according to claim 1, further comprising a removal feature shaped to allow removal of seal ring from contact with the sealing surfaces, wherein the removal feature extends from or into the seal ring and the removal feature is shaped to facilitate removing the seal ring from a sealing position.

6. The sealed joint system according to claim 1, wherein the dual barrier seal comprises an austenitic nickel-chromium alloy.

7. A dual barrier seal, comprising:
an annular metallic seal body including a pair of axially extending inner seal lips and a pair of axially extending outer seal lips, the pair of inner seal lips are connected to the pair of outer seal lips by a radially outwardly extending web portion, the pair of inner seal lips extend axially by a first dimension and the pair of outer seal lips extend axially by a second dimension which is greater than the first dimension,
wherein the pair of inner seal lips have a sealing surface that is one of a partially toroidal surface of revolution generated by revolving a portion of a circle in three-dimensional space with a hole in a middle or partially non-spherically elliptical and wherein the pair of outer seal lips have a sealing surface that is one of partially toroidal, partially elliptical, or conical.

8. The dual barrier seal according to claim 7, wherein a radial width of the pair of inner lips is greater than a radial width of the pair of outer seal lips.

9. The dual barrier seal according to claim 7, wherein the pair of outer seal lips have a contoured inwardly facing surface that is concave in cross-section and having the cross-sectional area near the sealing region having a substantially constant thickness.

10. The dual barrier seal according to claim 7, further comprising a retaining feature shaped to retain the dual barrier seal in a sealing position, wherein the retaining feature extends from the web portion of the dual barrier seal.

11. The dual barrier seal according to claim 7, further comprising a removal feature extending from or into the seal ring and the removal feature is shaped to facilitate removing the seal ring from a sealing position.

12. The dual barrier seal according to claim 7, wherein the dual barrier seal comprises an austenitic nickel-chromium alloy.

* * * * *